United States Patent [19]

Bilimoria et al.

[11] Patent Number: 5,223,463
[45] Date of Patent: Jun. 29, 1993

[54] PROCESS FOR PRODUCING A KAOLIN CLAY PRODUCT

[75] Inventors: Bomi M. Bilimoria, Macon; William E. Thompson, Sandersville, both of Ga.

[73] Assignee: ECC International Inc., Atlanta, Ga.

[21] Appl. No.: 738,911

[22] Filed: Aug. 1, 1991

[51] Int. Cl.$^5$ .................. C04B 33/00; C04B 33/02; C04B 33/04
[52] U.S. Cl. .................... 501/146; 501/145; 501/147; 106/416
[58] Field of Search .............. 501/146, 145, 147; 106/400, 401, 416

[56] References Cited

U.S. PATENT DOCUMENTS

| | | | |
|---|---|---|---|
| 3,661,515 | 5/1972 | Iannicelli et al. | 501/146 |
| 4,076,548 | 2/1978 | Bundy et al. | 106/416 |
| 4,144,083 | 3/1979 | Abercrombie, Jr. | 501/146 |
| 4,451,440 | 5/1984 | Thompson, III | 501/146 |
| 4,477,422 | 10/1984 | Ginn | 501/146 |
| 4,483,934 | 11/1984 | Goodman et al. | 501/146 |
| 4,859,246 | 8/1989 | Sennett | 501/146 |
| 4,935,391 | 6/1990 | Caropreso et al. | 501/146 |
| 4,943,324 | 7/1990 | Bundy et al. | 501/146 |
| 5,034,062 | 7/1991 | Lein et al. | 106/486 |
| 5,037,483 | 8/1991 | Dubin | 252/83 |
| 5,139,538 | 8/1992 | Morris et al. | 51/298 |

FOREIGN PATENT DOCUMENTS 0110036  6/1984  European Pat. Off. .
3901612A 7/1990  Fed. Rep. of Germany .
WO910413 4/1991  PCT Int'l Appl. .

OTHER PUBLICATIONS

International search report in corresponding International Application PCT/US92/06294.

*Primary Examiner*—Mark L. Bell
*Assistant Examiner*—Michael Marcheschi
*Attorney, Agent, or Firm*—Klauber & Jackson

[57] ABSTRACT

A process for producing a high brightness, high solids kaolin clay aqueous slurry. An aqueous low solids suspension of crude kaolin clay is degritted, and subjected to a particle size classification. The aqueous suspension of the fine particle fraction is acidified to a pH of 5.0 or lower to produce an acid flocculated suspension which is treated with a bleaching agent to reduce ferric ion impurities to ferrous ion impurities. A ferrous ion chelating agent is added to the bleached acid flocculated suspension after which an alkaline agent is added to raise the pH to a level greater than 5.0 to form a dispersed aqueous suspension of the beneficiated kaolin. The dispersed suspension is then subjected to membrane filtration to partially dewater same, and additional water is thermally evaporated from the partially dewatered dispersed kaolin suspension to produce the high solids product suspension.

16 Claims, No Drawings

PROCESS FOR PRODUCING A KAOLIN CLAY PRODUCT

BACKGROUND OF THE INVENTION

The present invention relates generally to the beneficiation of clay and, more particularly, to an improved method for bleaching kaolin clay in such a manner as to facilitate the subsequent dewatering, at least partially, of the kaolin clay slurry in the dispersed state via membrane filtration thereby eliminating the clay loss commonly encountered during dewatering via conventional mechanical techniques.

Kaolin clay has many known applications in industry including use as a filler in papermaking, a coating for paper, and a pigment in paint. However, crude kaolin clay typically contains various impurities which cause discoloration. Additionally, crude kaolin clay is typically too abrasive for direct use in products. Therefore, it is necessary to beneficiate the crude kaolin clay to increase the brightness of the kaolin by removing discoloration impurities and to decrease its abrasiveness by reducing the particle size of the kaolin particles.

In general, such processes for beneficiating crude kaolin clay require that the clay be refined via wet processing as a low solids slurry. Therefore, it is necessary to add substantial amounts of water to the dry crude kaolin clay to, form a clay suspension or slurry having a low solids content, generally below 50% solids by weight and typically in the range of 15% to 40% solids by weight. However, for commercial applications, the beneficiated clay slurry must have a much higher solids content. Typically, beneficiated kaolin clays are shipped commercially for use in paper making, paper coating and paint making as a high solids slurry having a solids content in the range of 65% to 75% by weight. Therefore, most of the water added to the dry kaolin clay must be removed in order to concentrate the clay solids.

In conventional prior art methods for refining kaolin clay via wet-processing, the crude kaolin clay is dispersed in water, usually with the aid of a dispersing agent, to form a flowable aqueous suspension or slurry. Typically, the aqueous crude clay suspension is then subjected to a fractionation operation which is conventionally carried out by centrifugation of the dispersed aqueous clay slurry. Typically, the aqueous kaolin slurry is fed to the centrifuge at a solids content in the range of 45% to 50% solids. The fine particle-size fraction, generally 90% finer than 2 micrometers equivalent spherical diameter (E.S.D.) in particle size, is recovered as a more dilute dispersed aqueous clay slurry, typically having a solids content ranging from 30% to 40% solids by weight, while the coarser fraction is discarded.

Following fractionation, the recovered aqueous clay slurry may be passed through a magnetic collector to remove at least a portion of any iron-based impurities therefrom. Such impurities discolor the kaolin and, if not removed, reduce the brightness of the beneficiated end product. Alternatively, but usually in conjunction with and subsequent to the magnetic separation operation, the aqueous clay slurry is subjected to a bleaching step to remove insoluble iron impurities by reducing the iron therein from the insoluble ferric state to the soluble ferrous state. In conventional prior art practice, the aqueous kaolin clay slurry is chemically flocculated to increase bleaching effectiveness, typically by acidifying the aqueous kaolin clay slurry prior to the bleaching operation by admixing therewith an aqueous acidic solution, such as dilute sulfuric acid, in an amount sufficient to reduce the pH of the aqueous kaolin slurry to a level in the range of 2.5 to 3.5. Additionally, the solids content of the aqueous kaolin clay slurry is typically reduced to a level of 20% to 30% solids by weight prior to the bleaching operation. The bleaching is carried out by contacting the aqueous kaolin clay slurry with a bleaching agent. The bleached kaolin clay slurry is now fully beneficiated and must be dewatered, rinsed and further dried to bring the kaolin slurry to commercially acceptable levels.

To dewater the beneficiated kaolin clay slurry by conventional practice, the low solids slurry is typically first passed to a mechanical filter or an electrofilter wherein a limited portion of the water is removed from the slurry. Conventional filters customarily used to carry out this initial dewatering include hydrocyclones, filter presses, various electrofilters utilizing electrokinetic phenomena such as electrophoresis and electroosmosis, and, most commonly, rotary vacuum filters. Rinsing of the filter cake is also conventionally carried out in conjunction with the dewatering process.

Typically, the rinsed kaolin clay slurry from such a conventional filter has a solids content ranging from 50% to 60% solids and must be further dewatered by thermal techniques to yield a shippable product. Prior to such further dewatering, the acid flocculated slurry must be redispersed. To do so, the pH of the slurry is adjusted to a pH of 6 to 7.5 by the addition of one or more of a number of conventional, commercially available dispersing agents, also known as deflocculants, such as sodium hydroxide, sodium silicate, sodium carbonate, sodium metaphosphate, and sodium polyacrylate. Unfortunately, residual by-product salts and residual dispersing agent remaining in the slurry being subjected to thermal drying are known to cause an undesirable degradation in the brightness of the thermally dried kaolin particles.

In thermal drying via conventional spray drying practice, at least a portion of the partially dewatered kaolin clay slurry is passed through a spray dryer or other contact-type evaporator such as a gas-fired kiln, wherein the kaolin clay slurry is contacted with a drying gas having a temperature of 1000° F. or more, such as hot air or hot flue gas generated from the combustion of a fossil fuel, typically natural gas. It is customary to pass only a portion, typically about 30% to 50%, of the kaolin clay slurry through the spray dryer and then re-mix the thoroughly dried clay slurry from the spray dryer with the remaining portion of the partially dewatered kaolin clay slurry in a high shear mixer to produce a product kaolin clay slurry having a solids content of 65% to 75%.

Alternatively, as disclosed is commonly assigned U.S. Pat. No. 4,687,546, the partially dewatered beneficiated kaolin clay slurry from the preliminary filtering step may be further dewatered by evaporating water therefrom by passing the aqueous kaolin clay slurry through one or more non-contact evaporative heat exchangers in heat exchange relationship with a heating vapor comprising water vapor previously evaporated from the clay slurry. In this manner, an energy efficient process is provided for concentrating a beneficiated aqueous clay slurry in that use is made of the heat normally wasted when the flue gas from the clay during the spray drying process, is vented to the atmosphere. Further, by using indirect heat exchange between the aqueous clay slurry and the heating vapor as a means of evaporating water vapor from the clay slurry, the formation of agglomerates typically encountered in direct contact with the heating gas is avoided and no degradation in brightness is experienced.

An alternative method of partially dewatering the kaolin clay slurry prior to thermal drying is disclosed in commonly assigned co-pending application Ser. No. 409,839, filed Sep. 20, 1989 now abandoned. As disclosed therein, an aqueous slurry of beneficiated kaolin clay is partially dewatered via membrane filtration prior to thermal drying. The aqueous clay slurry is passed along a semi-permeable membrane, while imposing a pressure differential across the membrane surface whereby water molecules are caused to pass through the semi-permeable membrane thereby increasing the concentration of the solids in the kaolin slurry in the direction of flow as the kaolin passes along the membrane. The semi-permeable membrane employed in the membrane filter is substantially impervious to the passage of clay solids therethrough, but pervious to the passage of water molecules, ions and dissolved salts therethrough. The aqueous clay slurry is discharged from the membrane filter separately from the filterate liquid as a more concentrated aqueous slurry of beneficiated kaolin clay particles. The filtrate liquid so removed from the aqueous clay slurry is substantially free of carry over clay solids. Residual salts from the bleaching process pass through the membrane filter with the filtrate liquid and therefore are not present in the kaolin clay when it is thermally dried. The presence of such residual salts in kaolin clays that have been partially dewatered on a rotary vacuum filter results in an undesirable degradation in the brightness of the beneficiated kaolin clay during thermal drying wherein the clay particles are directly contacted with a hot drying gas, such as during spray drying.

It is an object of the present invention to provide a method for wet processing a crude kaolin clay to produce a high brightness kaolin clay product wherein the kaolin clay is beneficiated by bleaching in the acid flocculated state followed by partial dewatering in a dispersed state prior to thermal drying.

SUMMARY OF THE INVENTION

A process is provided for producing a high brightness kaolin clay product of beneficiated kaolin clay particles in a high solids aqueous slurry. In accordance with the process, an aqueous suspension of crude kaolin clay is formed at a relatively low solids content of less than about 50% by weight of kaolin particles. The aqueous suspension of crude kaolin clay is next degritted to remove kaolin clay particles having a particle size greater than about 325 mesh to form an aqueous suspension of relatively fine-particle size kaolin clay particles which is then fractionated to the particle size desired in the final product. The desired fraction is next acidified to a pH at least less than 5.0, and preferably to a pH less than about 3.0, to produce an acid flocculated suspension. Thereafter, the acid flocculated aqueous suspension of relatively fine-particle size kaolin clay particles is treated with a bleaching agent to reduce ferric ion impurities contained therein to ferrous ion impurities.

In accordance with the present invention, a ferrous ion chelating agent, most advantageously citric acid at a treatment level of 0.1 to 10 pounds per ton of dry clay, is added to the bleached acid-flocculated aqueous suspension of relatively fine-particle size kaolin clay particles whereby the ferrous ions are captured by the ferrous ion chelating agent prior to adding an alkaline agent to the admixture to raise the pH to a level greater than 5.0 to form a dispersed aqueous suspension of beneficiated kaolin clay particles which may then be subjected to membrane filtration to partially dewater the dispersed aqueous suspension of beneficiated kaolin clay particles and thence thermally evaporated to remove additional water from the partially dewatered dispersed aqueous suspension of beneficiated kaolin clay particles to produce a high solids product suspension of high brightness kaolin clay particles.

DESCRIPTION OF THE PREFERRED EMBODIMENT

In order to be useful as paper fillers, paper coatings, paint extenders and other industrial purposes, naturally occurring kaolin crude clays are subjected to wet processing to remove grit thereby reducing the abrasiveness of the clay and to remove discoloration impurities thereby upgrading the brightness of the clay.

In order to wet process the crude kaolin clay, the crude kaolin is, as in conventional processing, blunged in water, advantageously in the presence of a water soluble dispersing agent, to form an aqueous suspension of slurry of kaolin clay particles at a low solids content, that is less than about 50% by weight, and generally in the range of 15% to 40% solids by weight. The dispersing agent added in forming the slurry may be one of any of a number of known, commercially available dispersants including, but not limited to, tetrasodium pyrophosphate, trisodium phosphate, sodium hexametaphosphate, tetrasodium phosphate, sodium tripolyphosphate, sodium silicate, sodium carbonate, sodium salts of weak acids, such as condensed napthalene sulfonic acid and polymeric carboxylic acid, and water-soluble organic polymeric salts, such as sodium or ammonium polyacrylate and sodium or ammonium polymethacrylate. Additionally, water-soluble pH modifiers, for example, sodium hydroxide and ammonium hydroxide, may be added in forming the slurry.

The aqueous kaolin clay slurry formed in the blunging operation is subjected to a degritting operation wherein coarse material is removed therefrom in order to reduce the abrasiveness of the slurry. To degrit the slurry, the crude kaolin slurry is passed through a screen to remove coarse oversize material, that is plus 325 mesh material. The degritted slurry is then fractionated to a desired final product particle size by subjecting the slurry to centrifugation via conventional practice to fractionate the slurry into an oversize fraction which is discarded and a desired finer fraction of aqueous clay slurry. Typically, the desired fine particle size fraction will have a particle size distribution wherein at least 80% by weight, and preferably about 90% to about 95% by weight of the particles are of less than 2 micrometers in equivalent spherical diameter. The degritted kaolin slurry will have a reduced solids content relative to the crude kaolin slurry due to the removal of the oversize grit material, typically in the range of about 30% to about 40% solids by weight.

Following degritting and fractionation to remove the undesired oversize fraction the aqueous kaolin clay slurry may be subjected to magnetic separation as in conventional practice to remove certain ferromagnetic impurities therefrom. The kaolin slurry may be subjected, alternatively to or in conjunction with magnetic separation, to other conventional beneficiation techniques, such as flotation, selective flocculation or ozonation as a means of removing a portion of the discoloration impurities, principally iron-containing and titanium containing minerals, thereby improving the brightness of the kaolin relative that of the crude kaolin.

In order to further improve the brightness of the kaolin slurry to commercially acceptable levels, the kaolin clay slurry is next subjected to a bleaching step wherein the remaining iron-based discoloration impurities are removed. To leach the kaolin slurry, an aqueous solution of a reducing agent is admixed into the aqueous kaolin clay slurry to reduce the ferric ions ($Fe^{3+}$) in the kaolin slurry to ferrous ($Fe^{2+}$) ions. Any one of a number of commercially available bleaching agents may be used as the reducing agent, including, but not limited to, sodium dithionite, sodium hypochlorite, sodium hyposulfite, sodium perborate, sodium peroxide, sodium perchlorate, or other cationic salts of the dithionite ion, the hypochlorite ion, the hyposulfite ion, the perborate ion, the peroxide ion and the perchlorate ion. Of course, admixing the aqueous solution of reducing agent into the clay slurry results in further dilution of the clay slurry, typically to a solids content ranging from about 20% to about 30% by weight.

As noted hereinbefore, to be commercially marketable and economically shippable, the beneficiated kaolin clay product, while in slurry form, must have a high solids content. Typically, the shippable product slurry will have a solids content in the range of 70% to 75% by weight. To concentrate the beneficiated kaolin clay slurry to the desired solids level in the process of the present invention the leached kaolin clay slurry is first redispersed from its acid flocculated state in order to facilitate dewatering via membrane filtration. To redisperse the bleached kaolin clay slurry, an alkaline agent, for example, sodium hydroxide, was admixed into the kaolin clay slurry to raise the pH of the kaolin slurry to a level above 5.0. Although sodium hydroxide is the preferred alkaline agent, it is understood that the alkaline agent may comprise any water soluble pH increasing agent that does not adversely impact on clay brightness or other clay properties. The redispersed, bleached kaolin clay slurry is first passed through a membrane filter means for partially dewatering the kaolin clay slurry from a low solids content, typically 20% to 30% by weight solids, to a more concentrated aqueous clay slurry, typically having a solids content ranging from about 50% to about 60% solids by weight. Most advantageously, this membrane filter dewatering step may be carried out as disclosed in the aforementioned commonly assigned, copending application Ser. No. 409,839, filed Sep. 30, 1989 now abandoned, the entire disclosure of which is hereby incorporated by reference.

To do so, the dilute aqueous slurry is passed through the membrane filter means wherein the aqueous slurry is contacted with a semi-permeable membrane which is substantially impervious to the passage of clay solids therethrough and pervious to the passage of water molecules, ions and dissolved salts. A pressure differential is imposed across the membrane to drive water molecules, ions and dissolved salts through the membrane thereby increasing the concentration of kaolin solids in the aqueous slurry. The permeate having passed through the membrane is substantially free of clay solids. Various types of commercially available membrane filter apparatus may be utilized in the process of the present invention, including but not limited to, plate and frame membrane filters, tubular membrane filters or spiral membrane filters. In the representative examples presented hereinafter, the membrane filter apparatus used was a tubular membrane filter. Advantageously, the bleached, redispersed kaolin clay slurry is preheated prior to membrane filtration, typically to a temperature in the range of about 40° C. to about 60° C., although higher preheat temperatures, such as up to about 95° C., may be utilized if such higher temperatures do not damage the semi-permeable membrane or other filter materials.

The partially dewatered kaolin clay slurry is thereafter passed through a thermal evaporator wherein additional water is removed from the aqueous clay slurry as a vapor by thermal evaporation to further concentrate the solids in the kaolin clay slurry to provide the beneficiated kaolin clay product as a commercially marketable and shippable slurry having a solids content of at least 65% by weight, and preferably in the range of 70% to 75% solids by weight. The thermal evaporator may comprise a conventional direct contact evaporative spray dryer, in which case a portion of the partially dewatered kaolin clay slurry is contacted with a hot drying gas to form a dry kaolin clay powder which is remixed with the remainder of the partially dried kaolin clay slurry to raise the solids level thereof to the desired solids level for shipment. Preferably, however, additional water is evaporated from the partially dewatered kaolin clay slurry to concentrate the solids therein to the desired higher level for shipment in accordance with the non-contact evaporative process disclosed in commonly assigned U.S. Pat. No. 4,687,546, wherein the partially dewatered kaolin clay slurry is passed through one or more non-contact evaporative heat exchangers with a heating medium, preferably hot water vapor previously evaporated from the slurry. By using indirect heat exchange between the aqueous clay slurry and the heating vapor as a means of evaporating water vapor from the clay slurry, the formation of agglomerates typically encountered in direct contact with the heating gas is avoided, and the degradation in brightness typically experienced in direct contact spray drying is avoided.

In accordance with the present invention, the reversion of ferrous ions after the bleaching process has been completed back to ferric ions, particularly when the slurry is treated with an alkaline agent to increase the pH thereof to a level above 5.0 to redisperse the slurry prior to dewatering via membrane filtration, is prevented by admixing a ferrous ion chelating agent to the bleached acid-flocculated aqueous suspension of relatively fine-particle size kaolin clay particles whereby the ferrous ions are chelated by the ferrous ion chelating agent. Preferably, the ferrous ion chelating agent is citric acid, which is admixed into the bleached acid-flocculated aqueous suspension of relatively fine-particle size kaolin clay particles at treatment level ranging from 0.1 to 10 pounds of citric acid per ton of dry clay. Although citric acid is the preferred ferrous ion chelating agent, it is to be understood that other ferrous ion complexing or sequestering agents may be used as equivalent chelating agents.

The following Examples illustrate that kaolin clay beneficiated and dewatered via membrane filtration in accordance with the present invention will have a brightness at least equivalent to the brightness of kaolin clay beneficiated via conventional techniques and dewatered via conventional vacuum filtration prior to spray drying. Examples I, II and III, show that beneficiating various kaolin clays in accordance with the present invention yields beneficiated product kaolins which exhibit brightness values as much as three-tenths of a point higher than a beneficiated product produced from the same crude kaolins via conventional wet-processing. Example IV illustrates that crude kaolin beneficiated by bleaching in the dispersed state to facilitate subsequent dewatering via membrane filtration, rather than being bleached in the acid flocculated state and then treated in accordance with the present invention to redisperse the bleached kaolin clay slurry to facilitate subsequent dewatering via membrane filtration, does not exhibit the improved brightness levels when compared with conventionally processed kaolins that are exhibited by beneficiated kaolins bleached in the acid flocculated state, treated with a ferrous ion chelating agent, redispersed and thence dewatered via membrane filtration in accordance with the process of the present invention.

EXAMPLE I

A fine particle size east Georgia kaolin clay from the Culpepper mine of Georgia Kaolin Company, Inc., was blunged in water with 5.5 pounds of dispersant per ton of dry clay to form a 35% solids by weight aqueous suspension. The dispersant used was a blend of sodium hexametaphosphate, sodium polyacrylate and soda ash. The blunged aqueous kaolin clay suspension was fractionated to 96% solids less than 2 micrometers and the coarse material was discarded. A first portion of the fine fraction of the fractionated kaolin clay suspension was processed by conventional techniques by acidifying the kaolin clay suspension by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. The bleached kaolin clay suspension was dewatered in accord with conventional practice without redispersing on a conventional vacuum filter to 55% solids by weight. A second portion of the fine fraction of the fractionated kaolin clay suspension was acidified by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. Thereafter, citric acid was added to the bleached kaolin clay suspension at the rate of one (1.0) pound of citric acid per ton of dry clay to complex the dissolved ferrous ions formed by reaction to the reducing agent with the ferric ions in the kaolin clay. The pH of the aqueous kaolin clay suspension was then raised to 6.5 by the addition of caustic soda (sodium hydroxide) to redisperse the kaolin clay suspension prior to dewatering. The dispersed, bleached kaolin clay suspension was dewatered on a membrane filter to 55% solids by weight. The brightness of each dewatered kaolin clay product was measured following standard TAPPI test procedures as described in TAPPI publication T 646 OM-66. The brightness of the first portion of the kaolin clay suspension processed by conventional bleaching and dewatering techniques was measured to be 88.0, while the brightness of the second portion of the kaolin clay suspension processed via bleaching and dewatering on a membrane filter in accordance with the present invention was measured to be 88.3.

EXAMPLE II

A fine particle size east Georgia kaolin clay from the Purvis mine of Georgia Kaolin Company, Inc., was blunged in water with 5.5 pounds of dispersant per ton of dry clay to form a 35% solids by weight aqueous suspension. The dispersant used was a blend of sodium polyacrylate and soda ash. The blunged aqueous kaolin clay suspension was fractionated to 96% solids less than 2 micrometers and the coarse material was discarded. A first portion of the fine fraction of the fractionated kaolin clay suspension was processed by conventional techniques by acidifying the kaolin clay suspension by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. The bleached kaolin clay suspension was dewatered in accord with conventional practice without redispersing on a conventional vacuum filter to 55% solids by weight. A second portion of the fine fraction of the fractionated kaolin clay suspension was acidified by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. Thereafter, citric acid was added to the bleached kaolin clay suspension at a rate of four (4.0) pounds of citric acid per ton of dry clay to complex the dissolved ferrous ions formed by reaction of the reducing agent with the ferric ions in the kaolin clay. The pH of the aqueous kaolin clay suspension was then raised to 6.5 by the addition of caustic soda (sodium hydroxide) to redisperse the kaolin clay suspension prior to dewatering. The dispersed, bleached kaolin clay suspension was dewatered on a membrane filter to 55% solids by weight. The brightness of each dewatered kaolin clay product was measured following standard TAPPI test procedures as described in TAPPI publication T 646 OM-66. The brightness of the first portion of the kaolin clay suspension processed by conventional bleaching and dewatering techniques was measured to be 88.1, while the brightness of the second portion of the kaolin clay suspension processed via bleaching and dewatering on a membrane filter in accordance with the present invention was measured to be 88.1.

EXAMPLE III

A fine particle size east Georgia kaolin clay from the Bowen Rabun mine of Georgia Kaolin Company, Inc., was blunged in water with 5.0 pounds of dispersant per ton of dry clay to form a 35% solids by weight aqueous suspension. The dispersant used was a blend of ammonium polyacrylate and ammonium hydroxide. The blunged aqueous kaolin clay suspension was fractionated to 96% solids less than 2 micrometers and the coarse material was discarded. A first portion of the fine fraction of the fractionated kaolin clay suspension was processed by conventional techniques by acidifying the kaolin clay suspension by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. The bleached kaolin clay suspension was dewatered in accord with conventional practice without redispersing on a conventional vacuum filter to 55% solids by weight. A second portion of the fine fraction of the fractionated kaolin clay suspension was acidified by the addition of sufficient sulfuric acid to decrease the pH of the kaolin clay suspension to 3.0 to acid flocculate the kaolin suspension prior to bleaching the kaolin clay suspension by adding thereto eight pounds of sodium dithionite reducing agent. Thereafter, citric acid was added to the bleached kaolin clay suspension at a rate of six (6.0) pounds of citric acid per ton of dry clay to complex the dissolved ferrous ions formed by reaction of the reducing agent with the ferric ions in the kaolin clay. The pH of the aqueous kaolin clay suspension was then raised to 6.5 by the addition of caustic soda (sodium hydroxide) to redisperse the kaolin clay suspension prior to dewatering. The dispersed, bleached kaolin clay suspension was dewatered on a membrane filter to 55% solids by weight. The brightness of each dewatered kaolin clay product was measured following standard TAPPI test procedures as described in TAPPI publication T 646 OM-66. The brightness of the first portion of the kaolin clay suspension processed by conventional bleaching and dewatering techniques was measured to be 87.9, while the brightness of the second portion of the kaolin clay suspension processed via bleaching and dewatering on a membrane filter in accordance with the present invention was measured to be 88.0.

EXAMPLE IV

A fine particle size Georgia kaolin clay from the Bragg-Fountain/Califf mine area of Georgia Kaolin Company, Inc., was blunged in water with 6-8 pounds of dispersant per ton of dry clay to form a 45% solids by weight aqueous suspension. The dispersant used was a blend of sodium hexametaphosphate and soda ash. The blunged aqueous kaolin clay suspension was fractionated to 98% solids less than 2 microns and the coarse material was discarded. The fine fraction was then passed through a magnetic separator to remove some ferromagnetic impurities prior to bleaching as in conventional practice. A first portion of the fine fraction of the fractionated kaolin clay suspension was processed by conventional techniques by acidifying the kaolin clay suspension by the addition of sufficient sulfuric acid to decrease the pH of the kaolin clay suspension to 3.0 to acid flocculate the kaolin suspension prior to bleaching the kaolin clay suspension by adding thereto the amount of sodium dithionite reducing agent necessary to maximize brightness. The optimally bleached kaolin clay suspension was dewatered in accord with conventional practice without redispersing on a conventional vacuum filter to 55% solids by weight. A second portion of the fine fraction of the fractionated kaolin clay suspension was bleached without reducing the pH of the suspension, i.e. the kaolin suspension was bleached in a dispersed state rather than a flocculated state, by adding thereto the amount of sodium dithionite reducing agent necessary to maximize brightness. Thereafter, citric acid was added to the bleached kaolin clay suspension at the rate of one (1.0) pound of citric acid per ton of dry clay. The already dispersed optimally bleached kaolin clay suspension was dewatered on a membrane filter to 55% solids by weight. The brightness of each dewatered kaolin clay product was measured following standard TAPPI test procedures as described in TAPPI publication T 646 OM-66. The brightness of the first portion of the kaolin clay suspension processed by conventional bleaching and dewatering techniques was measured to be 89.3, while the brightness of the second portion of the kaolin clay suspension processed via bleaching in the dispersed state and dewatering on a membrane filter was measured to be 88.4.

As can be seen from the foregoing representative Examples, the bleaching of the kaolin clay slurry in an acid flocced state followed by complexing the ferrous ions in the bleached clay prior to redispersing the bleached slurry and thence partially dewatering the redispersed beneficiated aqueous kaolin clay slurry on a membrane filter, as in accord with the process of the present invention, yields a kaolin clay product which has a brightness which is at least approximately equal to, and generally superior to, the brightness of conventionally processed kaolin clay. Further, the process of the present invention is shown by Examples I, II and III to yield a product kaolin clay which has a superior brightness to that of kaolin clay bleached in the dispersed state and thence partially dewatered on a membrane filter even with the addition of a complexing agent as represented by Example IV. The process of the present invention was effective in producing a high brightness product over a wide range of complexing agent treatment levels, with the optimum treatment level ranging from 0.1 to 10.0 pounds per ton of dry clay for citric acid as the complexing agent. While the present invention has been set forth in terms of specific embodiments thereof it will be understood in view of the present disclosure that numerous variations upon the invention are now enabled to those skilled in the art, which variations yet reside within the scope of the present teaching. Accordingly the invention is to be broadly construed and limited only by the scope and spirit of the claims now appended hereto.

What is claimed is:

1. A process for producing a high brightness kaolin clay product of beneficiated kaolin clay particles in a high solids aqueous slurry, comprising:
   a. forming an aqueous suspension of crude kaolin clay at a relatively low solids content of less than about 70% by weight of kaolin particles;
   b. degritting the aqueous suspension of crude kaolin clay to remove kaolin clay particles having a particle size greater than about 325 mesh to form a degritted aqueous suspension;
   c. fractionating the degritted aqueous suspension of crude kaolin clay to produce a finer fraction having a particle size distribution wherein at least about 80% by weight of the particles have a particle size less than 2 micrometers equivalent spherical diameter;
   d. acidifying the aqueous suspension of relatively fine-particle size kaolin clay particles to a pH at least less than 5.0 to produce an acid flocculated suspension;
   e. contacting the acid flocculated aqueous suspension of relatively fine-particle size kaolin clay particles with a bleaching agent to reduce ferric ion impurities contained therein to ferrous ion impurities;
   f. adding a ferrous ion chelating agent to the bleached acid flocculated aqueous suspension of relatively fine-particle size kaolin clay particles whereby the ferrous ions are chelated;
   g. admixing an alkaline agent with the bleached acid flocculated aqueous suspension of relatively fine-particle size kaolin clay particles to raise the pH to a level greater than 5.0 to form a dispersed aqueous suspension of beneficiated kaolin clay particles;

h. subjecting the dispersed aqueous suspension of beneficiated kaolin clay particles to membrane filtration to partially dewater the dispersed aqueous suspension of beneficiated kaolin clay particles; and i. thermally evaporating additional water from the partially dewatered dispersed aqueous suspension of beneficiated kaolin clay particles to produce a high solids product suspension of beneficiated kaolin clay particles.

2. A process as recited in claim 1 wherein the aqueous suspension of relatively fine-particle size kaolin clay particles is acidified to a pH of 3.0.

3. A process as recited in claim 1 wherein the aqueous suspension of relatively fine-particle size kaolin clay particles is acidified to a pH at least less than about 3.0.

4. A process as recited in claim 1 wherein the aqueous suspension of relatively fine-particle size kaolin clay particles is acidified by adding sulfuric acid thereto.

5. A process as recited in claim 1 wherein the step of adding a ferrous ion chelating agent to the bleached acid flocculated aqueous suspension of relatively fine-particle size kaolin clay particles whereby the ferrous ions are chelated comprises admixing citric acid into the bleached acid flocculated aqueous suspension of relatively fine-particle size kaolin clay particles at treatment level ranging from 0.1 to 10 pounds of citric acid per ton of dry clay.

6. A process as recited in claim 3 wherein the pH of the bleached acid-flocculated aqueous suspension of relatively fine-particle size kaolin clay particles is raised to a level between about 6.0 and about 7.0.

7. A process as recited in claim 1 wherein the dispersed aqueous suspension of beneficiated kaolin clay particles is preheated prior to membrane filtration.

8. A process as recited in claim 1 wherein the degritted aqueous suspension is fractionated to a particle size distribution wherein from about 90% to about 95% by weight of the particles have a particle size less than 2 micrometers equivalent spherical diameter.

9. A process for beneficiating a crude kaolin to produce a high brightness kaolin clay product of beneficiated kaolin clay particles in an aqueous slurry, comprising:

(a) forming an aqueous suspension of said crude kaolin clay and degritting and fractionating the aqueous suspension to produce an aqueous suspension of fine-particle size kaolin clay particles;

(b) acid flocculating said fine particle size suspension at a pH of 5.0 or lower and bleaching said slurry under said acid conditions to reduce ferric ion impurities contained therein to ferrous ion impurities;

(c) adding a ferrous ion chelating agent to the bleached acid flocculated aqueous suspension of relatively fine-particle size kaolin clay particles whereby the ferrous ions are chelated;

(d) raising the pH of the bleached acid flocculated aqueous suspension of fine-particle size kaolin clay particles to a level greater than 5.0 to form a dispersed aqueous suspension of beneficiated kaolin clay particles; and (e) subjecting the dispersed aqueous suspension of beneficiated kaolin clay particles to membrane filtration to at least partially dewater the said suspension.

10. A process as recited in claim 9, wherein step (b) is conducted at a pH of about 3.0.

11. A process as recited in claim 9, wherein step (b) is conducted at a pH lower than about 3.0.

12. A process as recited in claim 9, wherein the aqueous suspension of relatively fine-particle size kaolin clay particles is acidified by adding sulfuric acid thereto.

13. A process as recited in claim 9, wherein the step of adding a ferrous ion chelating agent to the bleached acid flocculated aqueous suspension of fine-particle size kaolin clay particles whereby the ferrous ions are chelated, comprises admixing citric acid into the bleached acid flocculated aqueous suspension at treatment level ranging from 0.1 to 10 pounds of citric acid per ton of dry clay.

14. A process as recited in claim 11, wherein the pH of the bleached acid-flocculated aqueous suspension of fine-particle size kaolin clay particles is raised in step (d) to a level between about 6.0 and about 7.0.

15. A process as recited in claim 9, wherein the dispersed aqueous suspension of beneficiated kaolin clay particles is preheated prior to membrane filtration.

16. A process as recited in claim 9, wherein the degritted aqueous suspension is fractionated to a particle size distribution wherein from about 90% to about 95% by weight of the particles have a particle size less than 2 micrometers equivalent spherical diameter.

* * * * *